(12) United States Patent
Nemesh et al.

(10) Patent No.: US 8,393,551 B2
(45) Date of Patent: Mar. 12, 2013

(54) COOLANT SYSTEMS FOR ELECTRIC AND HYBRID-ELECTRIC VEHICLES

(75) Inventors: Mark D. Nemesh, Troy, MI (US); Matthew J. Martinchick, Farmington, MI (US); Jeffrey M. Pleune, Rochester Hills, MI (US); Wissam Ibri, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1239 days.

(21) Appl. No.: 12/175,477

(22) Filed: Jul. 18, 2008

(65) Prior Publication Data
US 2010/0012741 A1    Jan. 21, 2010

(51) Int. Cl.
*B60L 11/00* (2006.01)
*B60L 11/02* (2006.01)

(52) U.S. Cl. ....... 237/12.3 B; 237/2 A; 701/22; 701/102

(58) Field of Classification Search ............. 237/12.3 B, 237/2 A; 701/102; *B60L 11/00, 11/12*
See application file for complete search history.

(56) References Cited

U.S. PATENT DOCUMENTS

| | | | |
|---|---|---|---|
| 4,632,205 A * | 12/1986 | Lewis | 180/165 |
| 5,255,733 A * | 10/1993 | King | 165/299 |
| 5,291,960 A * | 3/1994 | Brandenburg et al. | 237/12.3 B |
| 5,515,937 A * | 5/1996 | Adler et al. | 180/65.245 |
| 5,531,285 A * | 7/1996 | Green | 180/65.25 |
| 5,678,760 A * | 10/1997 | Muso et al. | 237/2 A |
| 5,832,396 A * | 11/1998 | Moroto et al. | 701/22 |
| 5,924,406 A * | 7/1999 | Kinugasa et al. | 123/436 |
| 5,971,290 A * | 10/1999 | Echigoya et al. | 237/12.3 B |
| 6,202,776 B1 * | 3/2001 | Masberg et al. | 180/65.22 |
| 6,454,180 B2 * | 9/2002 | Matsunaga et al. | 237/12.3 B |
| 6,574,977 B2 * | 6/2003 | Ozaki et al. | 62/210 |
| 6,595,433 B2 * | 7/2003 | Ap et al. | 237/12.3 B |
| 6,612,245 B2 * | 9/2003 | Kumar et al. | 105/26.05 |
| 6,892,541 B2 * | 5/2005 | Suzuki | 60/706 |
| 6,986,727 B2 * | 1/2006 | Kuras et al. | 477/4 |
| 6,989,644 B2 * | 1/2006 | Kim | 318/400.31 |
| 7,044,096 B2 * | 5/2006 | Foesel et al. | 123/142.5 E |
| 7,147,071 B2 * | 12/2006 | Gering et al. | 237/12.3 B |
| 7,344,687 B2 * | 3/2008 | Oi et al. | 701/22 |
| 7,379,797 B2 * | 5/2008 | Nasr et al. | 701/22 |
| 7,383,903 B2 * | 6/2008 | Varenne | 180/65.31 |
| RE40,820 E * | 7/2009 | Rogers | 324/427 |
| 7,597,164 B2 * | 10/2009 | Severinsky et al. | 180/65.27 |
| 7,702,432 B2 * | 4/2010 | Bandai et al. | 701/22 |
| 7,839,013 B2 * | 11/2010 | Nakamura et al. | 307/9.1 |
| 7,848,857 B2 * | 12/2010 | Nasr et al. | 701/22 |
| 8,171,860 B1 * | 5/2012 | Miller et al. | 105/49 |

(Continued)

FOREIGN PATENT DOCUMENTS

| | | |
|---|---|---|
| DE | 4142863 A1 | 4/1993 |
| GB | 2407432 A | 4/2005 |

*Primary Examiner* — Steven B McAllister
*Assistant Examiner* — Phillip E Decker

(57) ABSTRACT

A coolant system and method of operating the coolant system for a vehicle having a battery pack is disclosed. A method may include detecting a mountain grade descent condition; detecting a battery limit condition; and, if the mountain grade descent condition and the battery limit condition are detected, activating a coolant heater and a coolant pump to thereby accomplish an electric load shed. A method may include detecting a fuel cell stack warm up condition; and, if the fuel cell stack warm up condition is detected, activating a fuel cell coolant heater, a cabin coolant heater and a pump, and directing a coolant flowing through the cabin coolant heater through the fuel cell coolant heater and through a fuel cell stack to thereby warm the fuel cell stack.

4 Claims, 2 Drawing Sheets

U.S. PATENT DOCUMENTS

| | | | |
|---|---|---|---|
| 2002/0007943 A1* | 1/2002 | Ozaki et al. | 165/202 |
| 2004/0070372 A1* | 4/2004 | Kawai et al. | 322/7 |
| 2005/0088139 A1* | 4/2005 | Frank | 320/104 |
| 2005/0137060 A1* | 6/2005 | Kuras et al. | 477/214 |
| 2005/0284676 A1* | 12/2005 | King et al. | 180/65.3 |
| 2009/0017984 A1* | 1/2009 | Shibata et al. | 477/3 |
| 2009/0023548 A1* | 1/2009 | Imamura et al. | 477/3 |
| 2009/0311565 A1* | 12/2009 | Ishikawa | 429/26 |
| 2010/0012295 A1* | 1/2010 | Nemesh et al. | 165/104.19 |
| 2010/0235025 A1* | 9/2010 | Richter et al. | 701/22 |
| 2010/0324765 A1* | 12/2010 | Iida et al. | 701/22 |
| 2011/0031937 A1* | 2/2011 | Bito | 320/150 |

\* cited by examiner

COOLANT SYSTEMS FOR ELECTRIC AND HYBRID-ELECTRIC VEHICLES

BACKGROUND OF INVENTION

The present invention relates generally to electric vehicles, such as fuel cell vehicles, and hybrid-electric vehicles, and more particularly to coolant systems and methods of operating such coolant systems in these vehicles.

Advanced automotive vehicles are being introduced that employ fuel cells and hybrid-electric powertrains where there is no internal combustion engine or one that only operates intermittently during vehicle operation. In conventional vehicles, the internal combustion engine operates continuously, so the engine can be used not just to propel the vehicle, but as an ancillary power source, heat source, etc. for other vehicle systems. With some of the advanced automotive vehicles, then, alternative ways of efficiently providing the ancillary functions, while minimizing the cost, complexity, weight and packaging space are needed.

SUMMARY OF INVENTION

An embodiment contemplates a method of operating a coolant system for a vehicle having a battery pack, the method comprising the steps of: detecting a mountain grade descent condition; detecting a battery limit condition; and, if the mountain grade descent condition and the battery limit condition are detected, activating a coolant heater and a coolant pump to thereby accomplish an electric load shed.

An embodiment contemplates a method of operating a coolant system for a vehicle having a fuel cell stack and a battery pack, the method comprising the steps of: detecting a fuel cell stack warm up condition; and, if the fuel cell stack warm up condition is detected, activating a pump and a cabin coolant heater upstream from a heater core that is located in a HVAC module, and directing a coolant flowing through the cabin coolant heater, through the heater core and through a fuel cell stack to thereby warm the fuel cell stack.

An embodiment contemplates a coolant system for a vehicle having a fuel cell stack. The system may comprise a cabin heating branch and a radiator branch. The cabin heating branch may include a shut off valve configured to prevent a flow of a coolant through the cabin heating branch, a cabin coolant pump configured to selectively pump the coolant through the cabin heating branch, a cabin coolant heater having a first heating capacity and configured to selectively warm the coolant flowing through the cabin heating branch, and a heater core configured to mount in a HVAC module. The radiator branch may include a radiator configured to dissipate heat from the coolant flowing from the fuel cell through the radiator and a valve configured to control the coolant flow through the radiator. The system may also include a fuel cell pump configured to receive the coolant from the cabin heating branch and the radiator branch and pump the coolant through the fuel cell stack, and a fuel cell coolant heater having a second heating capacity that is equal to the first heating capacity.

An advantage of an embodiment is that the cabin coolant heater can be used as an additional source of electric load during a grade descent of the vehicle—either in addition to the fuel cell coolant heater in a vehicle that includes a fuel cell or separately for a hybrid-electric vehicle that includes an internal combustion engine.

An advantage of an embodiment is that the cabin coolant heater can be employed to supplement the fuel cell coolant heater (or eliminate the fuel cell coolant heater) for a vehicle having a fuel cell. Thus, the package size of the fuel cell coolant heater can be reduced (or eliminated), reducing weight and cost. Another advantage is that the fuel cell coolant heater may be made essentially of the same components as a cabin coolant heater, thus minimizing the number of different parts in the overall system-reducing cost and complexity of the system.

DETAILED DESCRIPTION

Figure 1:
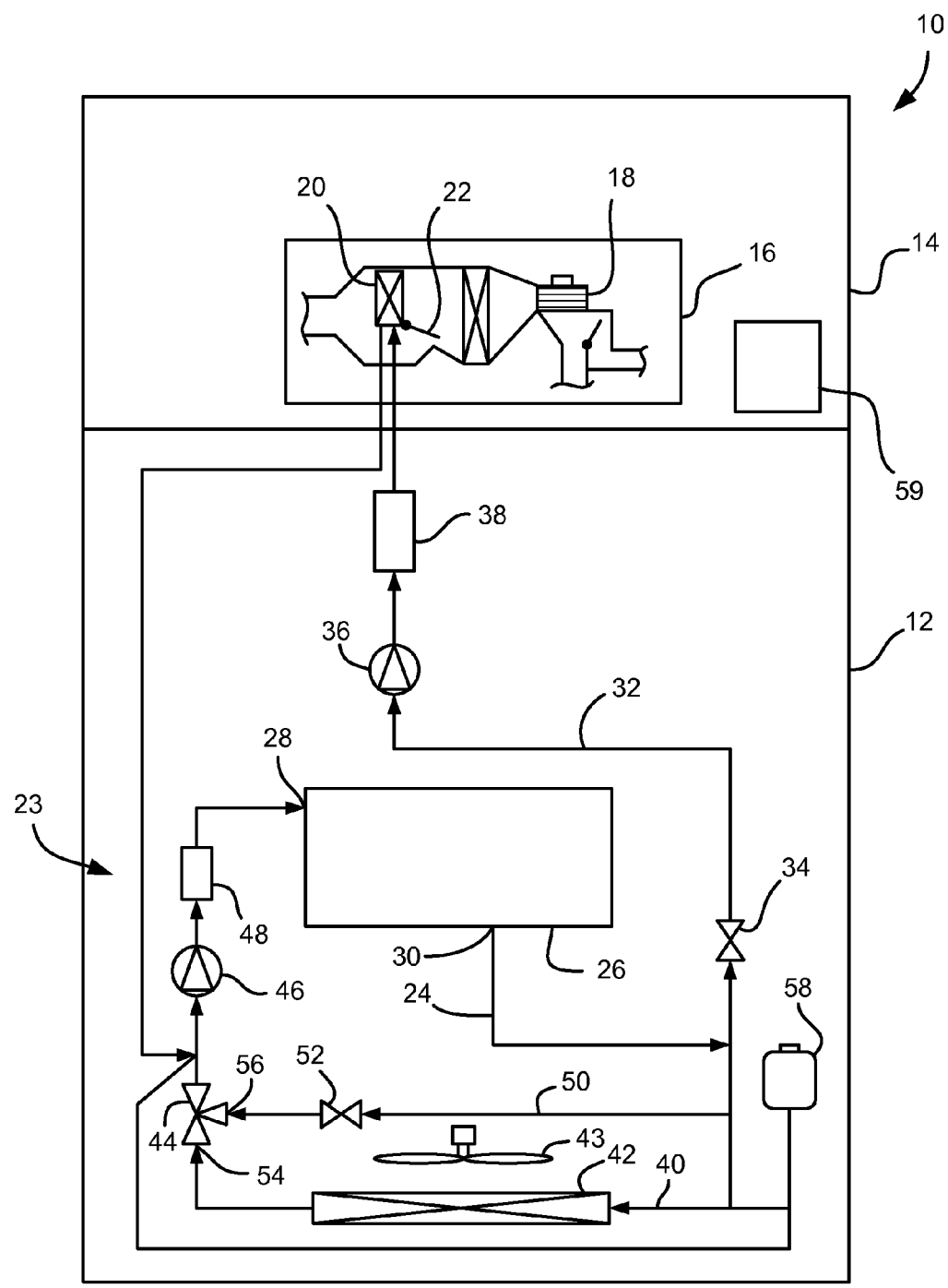
FIG. 1 is a schematic illustration of a vehicle having a vehicle coolant system according to a first embodiment.

Referring to FIG. 1, a vehicle, indicated generally at 10, is shown. The vehicle 10 may include an engine compartment 12 and a passenger/cargo compartment 14. A heating, ventilation and air conditioning (HVAC) module 16 may be located in and provide heating and cooling for the passenger/cargo compartment 14. The HVAC module 16 may include a blower 18 for causing air flow through the module 16, a heater core 20, used to selectively warm the air flowing through the module 16, and a temperature blend door 22, which is adjustable to proportionally direct the air through or around the heater core 20.

The heater core 20 is also part of a vehicle coolant system 23 having a coolant circuit 24. The coolant in the circuit 24 may be a conventional liquid mixture such as an ethylene glycol and water mix, or may be some other type of liquid with suitable heat transfer characteristics. Solid lines with arrows indicate coolant lines and the direction that coolant may flow through the lines under various operating modes. The coolant circuit 24 is not only used to supply warm coolant to the heater core 20 for warming the passenger compartment 14, but is also used for warming and cooling a fuel cell stack 26. The fuel cell stack 26 includes a coolant inlet 28 and a coolant outlet 30.

The coolant outlet 30 directs coolant to three branches of the coolant circuit 24. A first is a cabin heating branch 32 that includes a shut-off valve 34, a cabin coolant pump 36, a cabin coolant heater 38 and the heater core 20. The cabin coolant pump 36 may be electrically driven.

A second branch is a radiator branch 40 that includes a radiator 42 (adjacent to a fan 43), used to remove heat from the coolant. A third is a bypass branch 50 that includes a shut-off valve 52 that selectively allows the coolant to bypass the radiator 42. A three-way valve 44 includes a radiator branch input 54 and a bypass branch input 56 that selectively receive coolant from the radiator branch 40 and the bypass branch 50, respectively.

The cabin heating branch 32 joins the other two branches 40, 50 just downstream from the three-way valve 44. A surge tank 58 may be employed to account for thermal expansion in the coolant. Downstream from this, the coolant circuit 24 includes a fuel cell coolant pump 46 and fuel cell coolant heater 48. The fuel cell coolant heater 48 is just upstream from the coolant inlet 28 to the fuel cell stack 26. Again, the pump 46 may be electrically driven.

Alternatively, if the heating capabilities of the cabin coolant heater 38 are sufficient, the fuel cell coolant heater 48 may be eliminated. In another alternative, the coolant flow from the cabin coolant heater 38 may flow in parallel with the coolant flow through the fuel cell coolant heater 48, rather than a serial flow through the two coolant heaters 38, 48.

The operation of the vehicle coolant system 23 of FIG. 1 will now be discussed. In a first operating mode, the vehicle is operating during a mountain grade descent. A mountain grade descent is one where the vehicle is traveling downhill for a relatively long period of time and the grade is steep enough that some type of braking is needed to slow the vehicle during this descent. In conventional vehicles, an engine is operating continuously and is the source of torque for the wheels, so the engine may be employed to assist the wheel brakes in a mode called "engine braking."

In the vehicle of this first embodiment, there is no engine providing torque to the wheels, so "engine braking" takes a different form. An electric motor drive unit (not shown), which provides torque to the vehicle wheels, can help slow the vehicle ("engine braking") by acting as a generator in a regenerative braking operation. This energy can then be stored in a battery pack 59 up to the battery pack 59 reaching 100% state-of-charge or a predetermined thermal limit. Accordingly, when the battery pack state-of-charge is at or near 100% or at the thermal limit, the coolant heaters 38, 48 and pumps 36, 46 are operated to create sources for electric load shed. This uses the electric energy being produced by regenerative braking and so allows the "engine braking" to continue providing assistance decelerating the vehicle during the grade descent. This also avoids requiring the vehicle's brakes (not shown) to perform 100% of the vehicle deceleration down the mountain grade.

Since activating the coolant heaters 38, 48 during grade descent may generate more heat in the coolant than is desirable, not only is the shut off valve 34 opened to direct the coolant through the cabin heating branch 32, but also the shut-off valve 52 is closed and the three-way valve 44 is actuated to direct coolant through the radiator branch 40, allowing the waste heat to be rejected from the coolant by the radiator 42. Also, the temperature blend door 22 is adjusted, as needed, to maintain the passenger compartment comfort. This may include moving the blend door 22 to block air flow through the heater core 20, causing all of the air flow in the HVAC module 16 to flow around the heater core 20 instead.

The operation of the vehicle coolant system 23 of FIG. 1 in a second operating mode, will now be discussed. In this mode, the fuel cell is initially started in cold ambient conditions. Under such conditions, it is typically desirable to provide coolant warming during some initial time period, for example, forty to sixty seconds immediately after start. In order to allow for the desired quick fuel cell stack warm up while minimizing the capacity of the fuel cell coolant heater 48, both coolant heaters 38, 48 are employed during this initial warm up period to provided warmed coolant for the fuel cell stack 26.

In this second mode, the cabin coolant heater 38, the fuel cell coolant heater 48, the cabin coolant pump 36 and the fuel cell coolant pump 46 are activated. Also, the shut-off valve 34 is opened and the shut-off valve 52 is closed, while the three-way valve is set to direct the coolant into the pump 46 from the bypass branch 50. Also, the blower 18 is turned off or operated at a low speed to minimize the heat transfer from the coolant flowing through the heater core 20. The coolant flowing from the fuel cell stack 26 flows through the cabin heating branch 32 and is warmed by the cabin coolant heater 38. It then flows from the cabin heating branch 32, through the pump 46 and fuel cell coolant heater 48 (where additional heat is absorbed by the coolant), before flowing into the fuel cell stack 26. Thus, both coolant heaters contribute to fuel cell stack warm up, which allows the fuel cell coolant heater 48 to be smaller than would otherwise be needed.

Under other operating conditions, the coolant may flow from the coolant outlet 30 of the fuel cell stack 26 and through the bypass branch 50. This may occur, for example, under vehicle operating conditions where cooling of the coolant by the radiator 42 is not desired because the coolant temperature has not risen to a desired operating temperature range for the fuel cell stack 26. Also, in another operating condition, the coolant is pumped through the cabin heating branch 32 with the cabin coolant heater activated in order to provide warmed coolant to the heater core 20. The blower 18 is activated and the temperature blend door is moved to direct some or all of the air flow through the heater core 20 to provide heat to the passenger compartment 14.

Figure 2:
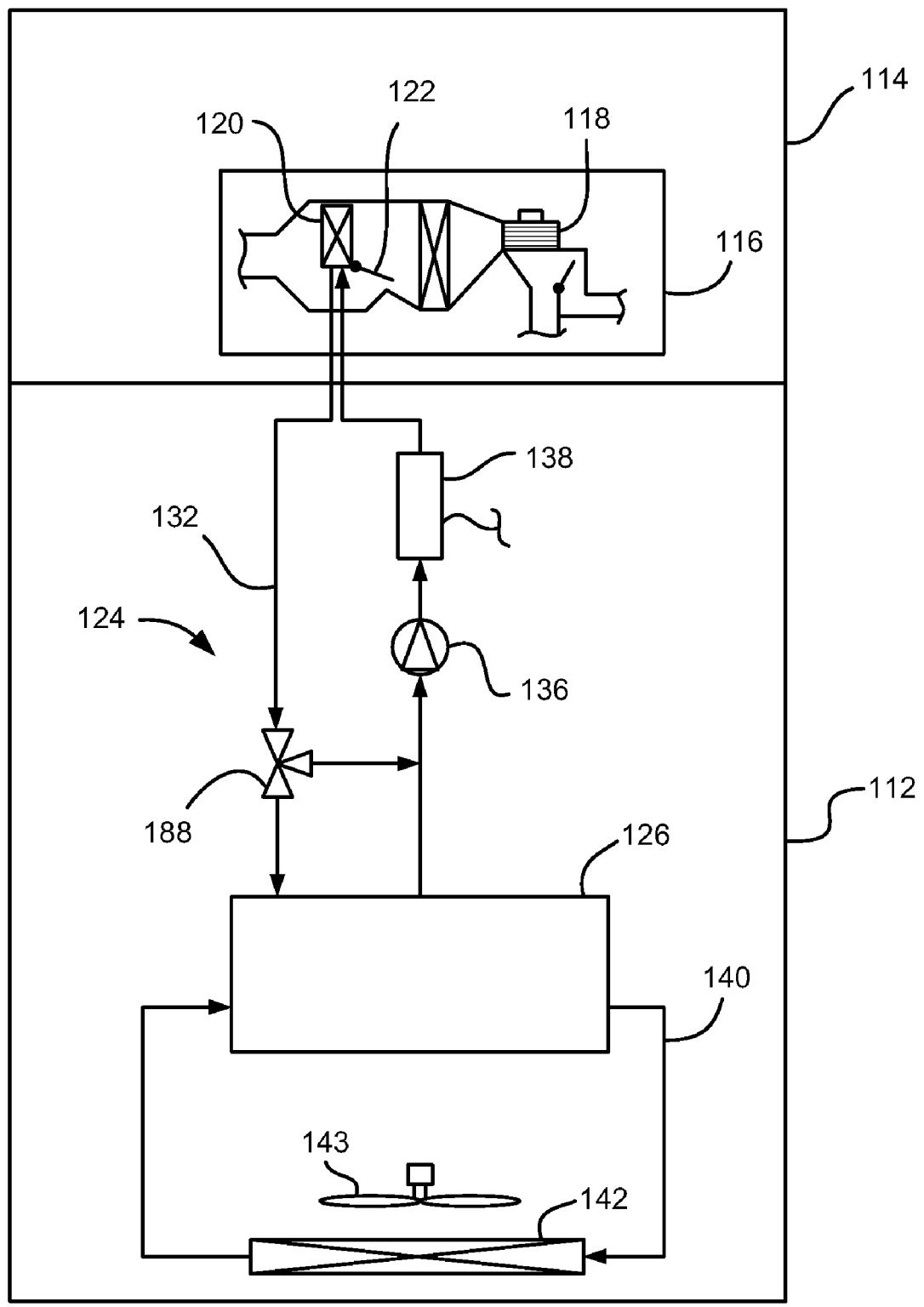
FIG. 2 is a schematic illustration of a vehicle similar to FIG. 1, but illustrating a second embodiment.

FIG. 2 illustrates a second embodiment. Since this embodiment is similar to the first, similar element numbers will be used for similar elements, but employing 100-series numbers. In this embodiment, the passenger compartment 114, including the HVAC module 116 may be essentially the same as in the first embodiment. The HVAC module 116 may still include a blower 118, temperature blend door 122 and a heater core 120. In the engine compartment 112, however, an internal combustion engine 126 is employed instead of a fuel cell.

A radiator branch 140 of a coolant circuit 124 may still include a radiator 142 (with a fan 143 for drawing air through the radiator 142), with the bypass branch (not shown) configured in a more conventional fashion employing a thermostat (not shown). A more conventional water pump (not shown) may be employed to pump the coolant through the engine 126 and the radiator branch 140.

A cabin heating branch 132 of the coolant circuit 124 still includes a cabin coolant pump 136, a cabin coolant heater 138, and the heater core 120, and also now includes a three-way valve 188. The three-way valve 188 allows the coolant to be selectively circulated in the cabin heating branch 132 without flowing through the engine 126. This may be desirable when the coolant in the engine 126 is not warmed up. Under this operating condition, the coolant flowing in the cabin heating branch 132 that is warmed by the cabin coolant heater 138, then, is retained in that branch 132 in order to maximize the heat provided to the heater core 120.

Since there is no fuel cell stack in this embodiment, there is no need for a fuel cell coolant heater. Consequently, this component and the fuel cell stack warm-up operating condition are eliminated. However, the cabin coolant heater 138 may still be employed for the mountain grade descent operating mode.

In the mountain grade descent operating mode, when the battery pack state-of-charge is at or near 100% or at the predetermined thermal limit, the cabin coolant heater 138 and cabin coolant pump 136 are operated to create sources for electric load shed. This uses the electric energy being produced by regenerative braking and so allows the "engine braking" to continue providing assistance decelerating the vehicle during the grade descent. Since activating the coolant heater 138 during grade descent may generate more heat in the coolant than is desirable, the three-way valve 188 may be set to direct the coolant into the engine 126, and the engine 126 may be operated at a low idle setting to allow the coolant to flow through the radiator 142, thus removing this excess heat.

While certain embodiments of the present invention have been described in detail, those familiar with the art to which this invention relates will recognize various alternative designs and embodiments for practicing the invention as defined by the following claims.

What is claimed is:

1. A method of operating a coolant system for a vehicle having a fuel cell stack and a battery pack, the method comprising the steps of:
   (a) detecting a fuel cell stack warm up condition, the warm up condition being when the fuel cell stack is below a predetermined temperature range and is warming up;
   (b) if the fuel cell stack warm up condition is detected, activating a pump and a cabin coolant heater upstream from a heater core, which is located in a HVAC module, and directing a coolant flowing through the cabin coolant heater, through the heater core and through a fuel cell stack to thereby warm the fuel cell stack;
   (c) if the fuel cell stack warm up condition is detected, adjusting a blower to minimize an air flow in the HVAC module;
   (d) detecting a mountain grade descent condition, the mountain grade descent condition including at least that the vehicle is traveling downhill;
   (e) detecting a battery limit condition, the battery limit condition including the battery pack reaching an upper limit;
   (f) if the mountain grade descent condition and the battery limit condition are detected, activating the cabin coolant heater, which is a part of a cabin heating branch that directs a coolant through the heater core in the HVAC module, to thereby accomplish an electric load shed; and
   (g) if the mountain grade descent condition and the battery limit condition are detected, activating a fuel cell coolant heater to thereby increase the electric load shed.

2. The method of claim 1 wherein step (b) is further defined by: if the fuel cell stack warm up condition is detected, activating the fuel cell coolant heater and directing the coolant flow from the fuel cell coolant heater through the fuel cell stack.

3. A method of operating a coolant system for a vehicle having a fuel cell stack and a battery pack, the method comprising the steps of:
   (a) detecting a fuel cell stack warm up condition, the warm up condition being when the fuel cell stack is below a predetermined temperature range and is warming up;
   (b) if the fuel cell stack warm up condition is detected, activating a pump and a cabin coolant heater upstream from a heater core, which is located in a HVAC module, and directing a coolant flowing through the cabin coolant heater, through the heater core and through a fuel cell stack to thereby warm the fuel cell stack;
   (c) if the fuel cell stack warm up condition is detected, adjusting a blower to minimize an air flow in the HVAC module;
   (d) detecting a mountain grade descent condition, the mountain grade descent condition including at least that the vehicle is traveling downhill;
   (e) detecting a battery limit condition, the battery limit condition including the battery pack reaching an upper limit; and
   (f) if the mountain grade descent condition and the battery limit condition are detected, activating a fuel cell coolant heater to thereby accomplish an electric load shed.

4. The method of claim 3 wherein step (f) is further defined by: if the mountain grade descent condition and the battery limit condition are detected, routing the coolant flowing through the fuel cell coolant heater through a radiator to thereby dissipate heat from the coolant.

* * * * *